United States Patent [19]
Boehm et al.

[11] 3,919,893
[45] Nov. 18, 1975

[54] MULE DRIVER IDLER LOCKOUT DEVICE

[75] Inventors: Rudolph A. Boehm, Downers Grove; Gerald N. Borchardt, Hinsdale; Wayne A. Zahlit, Westmont, all of Ill.

[73] Assignee: International Harvester Company, Chicago, Ill.

[22] Filed: July 12, 1974

[21] Appl. No.: 488,131

[52] U.S. Cl. ............................ 74/242.15 R; 74/227
[51] Int. Cl.² .......................................... F16H 1/10
[58] Field of Search ............ 74/242.15 R, 242.11 R, 74/227

[56] References Cited
UNITED STATES PATENTS

| 3,239,021 | 3/1966 | Harvey | 74/242.15 R X |
| 3,311,186 | 3/1967 | Kamlukin | 74/242.15 R X |
| 3,465,607 | 9/1969 | Erdman | 74/227 |
| 3,613,462 | 10/1971 | Stibbe | 74/242.15 R X |

Primary Examiner—Leonard H. Gerin
Attorney, Agent, or Firm—Dennis K. Sullivan; Floyd B. Harman

[57] ABSTRACT

An idler lockout bar is provided for a garden tractor implement mule drive, the lockout bar extending from one idler sheave through the frame. The lockout bar moves the idler against the idler tensioning spring to remove all tension on the belt and is provided with a shoulder or notch which engages the frame to maintain the idler in lockout position to facilitate the easy installation and removal of the belt.

11 Claims, 4 Drawing Figures

MULE DRIVER IDLER LOCKOUT DEVICE

BACKGROUND OF THE INVENTION

This invention relates to belt drive apparatus for a tractor-mounted implement of the type known in the industry as a mule drive and more particularly, to a idler lockout bar therefor which moves one of the mule idler sheaves to a position wherein the belt is untensioned and maintains it there to permit the installation or removal of the belt.

THE PRIOR ART

In prior art mule drives such as that shown in U.S. Pat. No. 3,465,607 to Erdman, it has been customary to drive a tractor-mounted implement, such as a belly mounted mower, by providing a vertical drive sheave on the front of the tractor, a horizontal driven sheave on the mower, and a pair of laterally spaced vertical idler sheaves which permit a 90° change in the plane of the belt. As is also shown in the Installation Instructions No. 1083672R1 for the 38, 42, and 48-inch, 3-spindle mowers manufactured by the International Harvester Company, it is customary for the idler sheaves to be rotatably journalled on arms mounted for rotation about a lateral shaft to permit the idler sheaves to move forwardly to tension the drive belt. It is also customary for one of the idlers to be provided with a spring to urge it to a position tensioning the belt and for the other idler to be provided with a bolt pulling it forwardly toward the frame against the spring force for setting and adjusting the belt tension. The aforementioned Erdman patent also provides a means for indicating the tension or elongation of the belt which comprises an indicator associated with the tensioning spring lever which moves up and down in a slot depending on the deflection of the tensioning spring.

These prior art drives have been generally satisfactory; however, some problems have been found to exist in the installation and removal of the belt when installing or removing the mower. This can be quite difficult to accomplish without releasing the belt tension. Accordingly, the prior art has taught a complete slackening of the belt by releasing the tension setting and adjusting bolt or screw. This has resulted in having to reset the tension each time the belt was removed. With the configuration taught in the Installation Instructions referred to above, this was time consuming, inconvenient, and required tools. Erdman attempted to provide a remedy for this but his device is more complicated and apparently more expensive and is still time consuming and inconvenient since it would apparently require a considerable amount of turns on his adjusting screw to go from a slack position to a fully tensioned position.

SUMMARY OF THE INVENTION

Accordingly, it is an object of the present invention to provide a mule drive assembly for a tractor mounted implement in which the belt tension can be removed without disturbing the tension adjustment.

A more specific object of the invention is to provide a mule drive assembly providing means for locking out the spring-biased idler sheave and maintaining the sheave in the lockout position to permit the installation and removal of the belt.

A further object of the invention is to provide the above-described idler lockout means with means to indicate the tension on the belt when the idler sheave in in the operating position.

A still further object of the invention is to provide the idler lockout means with stop means to prevent its unaided travel toward the lockout position beyond a predetermined point to prevent the belt from being thrown from the sheave as might occur under certain dynamic loading conditions.

These and other objects and advantages of the invention will be apparent to those skilled in the art after a consideration of the following detailed description, taken in conjunction with the accompanying drawings.

DESCRIPTION OF THE PREFERRED EMBODIMENT

In the following description right-hand and left-hand reference is determined by standing at the rear of the tractor and facing the direction of travel.

Figure 1:
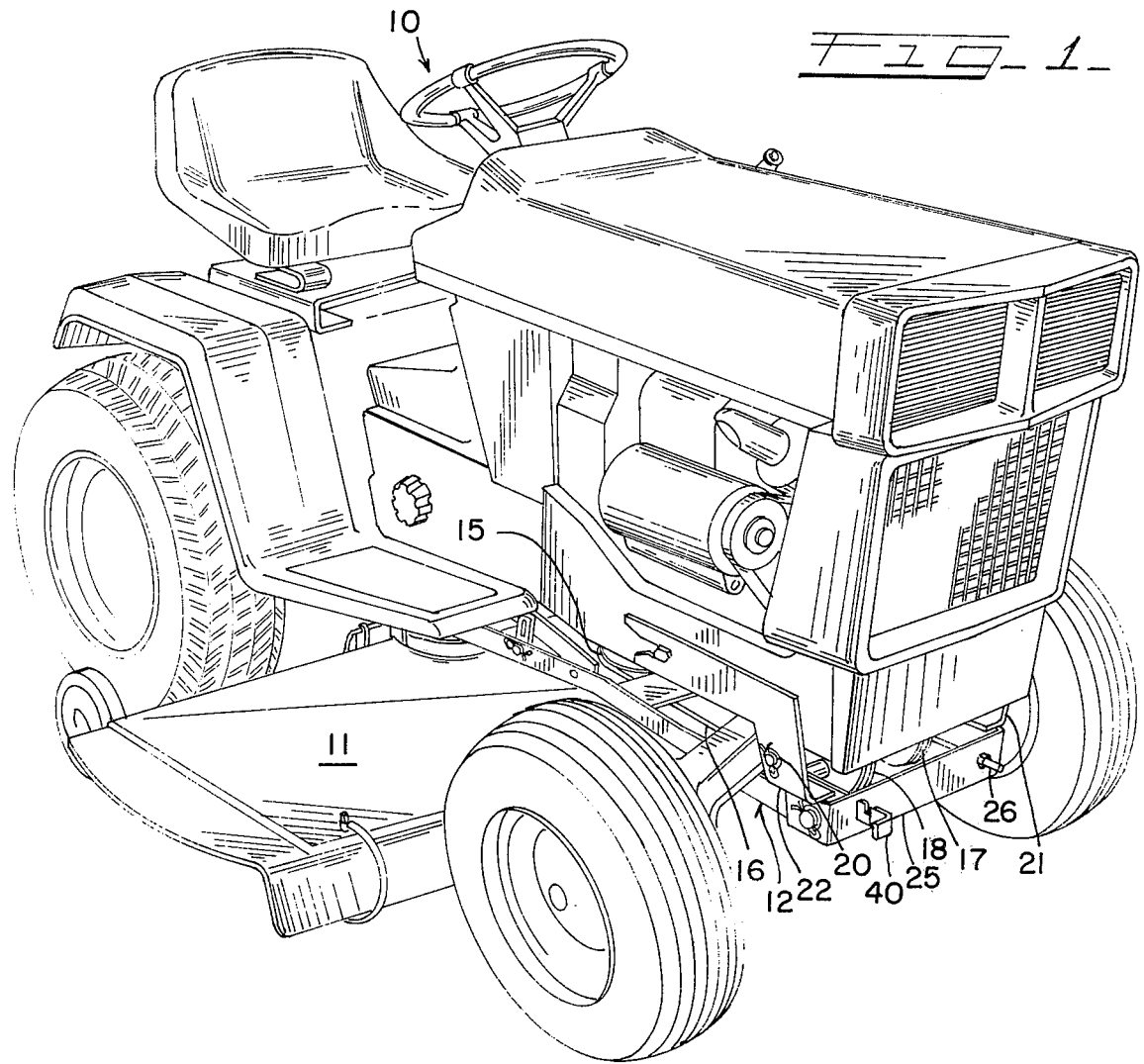
FIG. 1 is a perspective view of a garden tractor-implement combination employing Applicant's invention.

Referring first to FIG. 1, there is shown a garden tractor generally designed 10 having an implement, such as a multiple spindle mower 11, belly-mounted therebeneath by means of a sub-face and linkage assembly 12. The specific sub-frame and linkage assembly are not important to the invention at hand; however, those interested in this area will find one such sub-frame and linkage apparatus described in detail in Borchardt, et al. U.S. Pat. No. 3,508,386.

Figure 2:
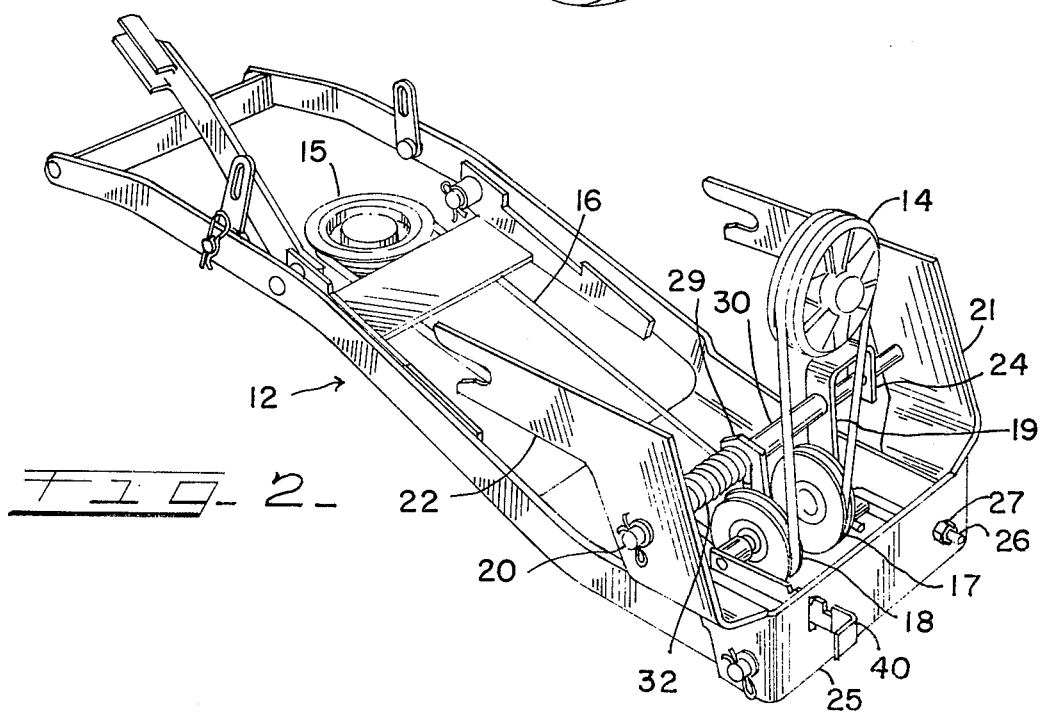
FIG. 2 is a perspective view of the subframe of the garden tractor-mower combination of FIG. 1 specifically illustrating the mule drive to the mower input sheave.

In accordance with the art, the engine of the garden tractor 10 is provided with a front power take-off clutch pulley or sheave 14 which is illustrated in FIG. 2, for driving a horizontal sheave 15 drivingly connected with the blades of the mower 11. The belt drive assembly between the drive sheave 14 and the driven sheave 15, which is commonly referred to in the industry as a mule drive, comprises an endless belt 16 disposed respectively about the drive and driven sheaves 14 and 15 and left and right idler sheaves 17 and 18, respectively, vertically disposed for rotation about a transverse axis beneath the drive sheave 14 to change the plane of the belt drive from vertical to horizontal, as is best seen in FIG. 2.

The left idler sheave 17 is rotatably mounted on a pin attached at one end of an arm 19 having its other end freely rotatably mounted about a transverse shaft 20 supported at either end on the laterally spaced upright members 21 and 22 of the frame assembly 12. The idler sheave arm 19 at its upper end is bent over along the transverse shaft 20 and acts as a spacer to maintain the general lateral position of the idler 17, its left end 24 abutting the main frame of the tractor 10 which fits inside the left frame member 21 when the sub-frame is installed on the tractor.

Figure 3:
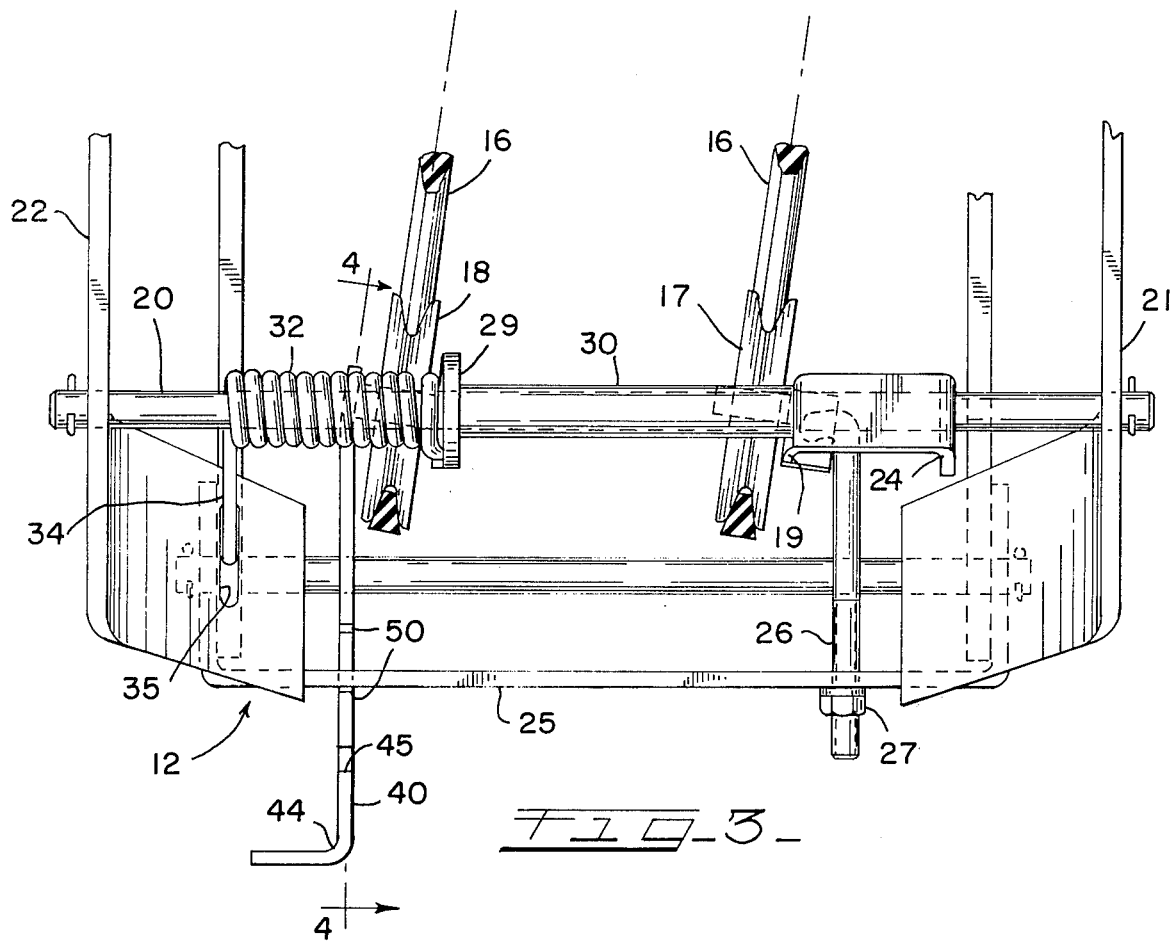
FIG. 3 is a top view of the forward portion of the frame of FIG. 2 showing the idler sheave assemblies and Applicants' lockout bar.

Interconnecting the left and right members 21, 22 of the sub-frame 12, is by being welded to the lower portion thereof is a front cover member 25 which forms the front portion of the sub-frame parallel with the shaft 20. A tension adjusting bolt 26 extends through a hole provided in the front cover 25 to the left idler arm 19 whereat the adjusting bolt is provided with a hooked portion which engages the idler sheave arm 19, the adjusting bolt being provided with a nut 27 on the front side of the front cover 25. It can be seen from FIG. 3 that adjusting the nut 27 to pull the tension adjusting bolt 26 forward will pull the arm 19 and left idler sheave 17 forward, thereby tensioning the belt 16.

Figure 4:
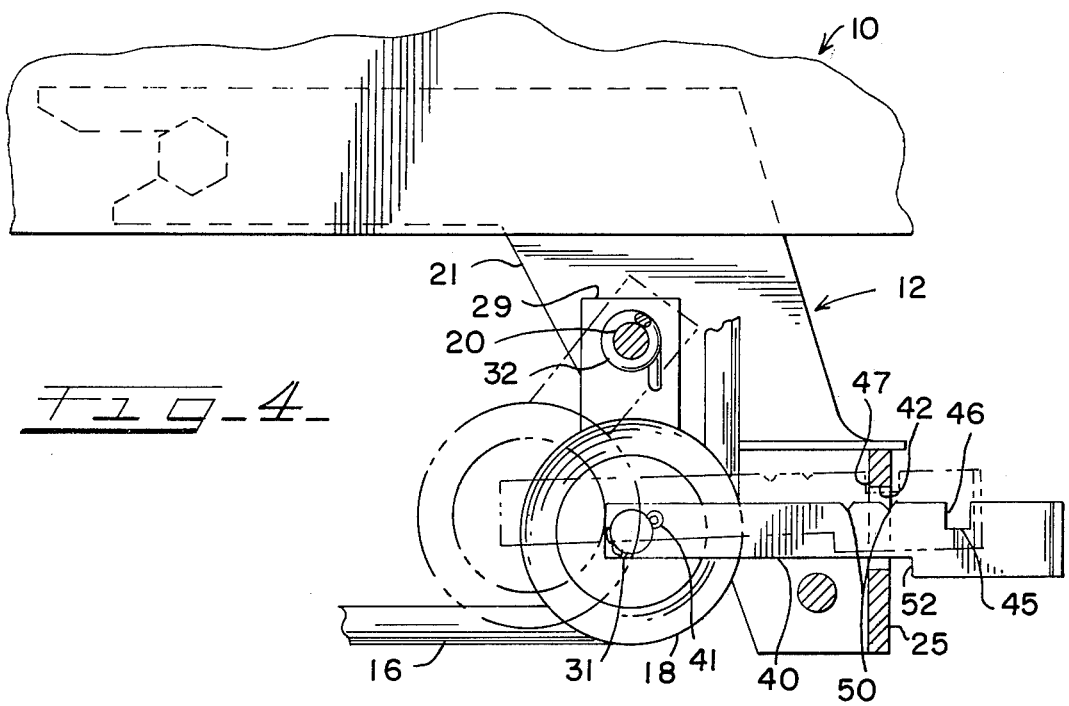
FIG. 4 is a side sectional view of the idler assembly taken along the length of the lockout bar and along the line 4—4 of FIG. 3.

Rightward along the shaft 20 from the lever 19 is the right idler sheave support arm 29, a spacer 30 being interposed therebetween to maintain the proper separation of the two portions of the belt 16. As is best seen in FIG. 4, the right idler sheave arm 29 is freely rotatable about the shaft 20 and is provided with a pin 31 at its lower end for rotatably mounting the right idler sheave 18. Engaging the right idler sheave arm 29 is one end of the tensioning spring 32, the spring 32 being wound around the shaft 20 and having its other end 34 retained in a slot 35 (FIG. 3) in the right frame member 22, the spring 32 being arranged to bias the arm 29 and idler sheave 18 in the direction shown in the arrow in FIG. 4 to maintain tension on the belt, all of the foregoing structure being in accordance with the general practice of the art.

In accordance with the invention, the right idler sheave 18 is provided with an idler lockout bar 40, the lockout bar 40 comprising a flat elongated strip having a hole at one end receiving the pin 31 of the right idler arm 29 outboard of the idler sheave 18, a cotter pin 41 retaining the lockout bar on the pin. From the idler sheave 18, the lockout bar 40 extends forwardly into a slot 42 in the front cover 25 to its opposite end which is bent over as at 44 to provide a handle. As best seen in FIG. 4, the upper side of the bar 40 is provided with a notch or detent 45, the rearward portion 46 thereof providing a shoulder which engages the rear side 47 of the front cover 25. When the lockout bar 40 is pushed rearwardly, that is inwardly, it overcomes the spring 32 and allows the idler sheave 18 to disengage from the belt. With the lockout bar raised upwardly in this position, as shown in phantom in FIG. 4, the biasing force of the tension spring 32 holds the shoulder 46 against the surface 47 so that the idler is retained in the lockout position. The location of the notch 45 on the idler lockout bar 40 is preferably disposed so that when the notch 45 engages the frame 25, the idler 18 will be pushed back to a position not only relieving all tension on the belt or operatively disengaging therefrom but also providing sufficient slack in the belt to remove it from the groove of the sheave.

The idler lockout bar 40 is also provided with a pair of notches 50 located on the top side between the notch 45 and the idler sheave 18 to provide indicating means for determining the tension or elongation on the belt. The notches are so located so that the forward notch is just even with the forward side of the front cover plate 25 when the belt assembly is properly tensioned and the rear notch is positioned so that it will be even with the forward end of the plate when the tension is at the lowest permissible level short of slippage.

Another feature provided in accordance with the invention is a rearwardly facing stop means or shoulder 52 on the lower side of the idler lockout bar between the forwardmost notch 50 and the lockout notch 45 and which is positioned to prevent the belt from slackening, even though all tension might be released. While the purpose of this stop means 52 may not be readily apparent from an examination of the drawings, it will be appreciated that during operation of the tractor-implement combination, there may occur severe transient loads on the belt 16 which may cause the right idler pulley 18 to move rearwardly against the tensioning spring 32 and then forwardly as the transient load is relieved. Stop 52 prevents undesired movement of the idler sheave 18 sufficiently rearwardly to allow the belt to jump out of the sheave groove and is maintained in engagement with the front side of the front cover 25 by gravity.

In operation, when it is desired to install the belt, the idler lockout bar 40 is pushed rearwardly or inwardly and raised to permit the stop means 52 to enter the slot 42 until the notch 45 is in register with the cover plate 25. The idler lockout bar 40 is then raised so that the shoulder 46 of the lockout bar engages the rear surface 47 of the cover plate, the tension spring 32 providing sufficient force to maintain the parts in this position which is shown in phantom in FIG. 4. In this position, the belt may be disposed over the sheaves, as shown in FIG. 2. The lockout bar is then released tensioning the belt, gravity causing the lockout bar to drop down to permit the stop 52 to engage the front of cover plate. The tensioning bolt 26 on the left idler 17 may now be adjusted, if necessary, to set the belt tension at the proper level, the notches 50 on the idler lockout bar 40 being used as a gage for determining this.

When it is desired to remove the belt, as when the mower from the tractor, the idler lockout bar is pushed inwardly and rearwardly, as described above, to lock the idler sheave 18 in the lockout position. The belt may then be removed without disturbing the tension setting on the tension adjusting bolt 26.

Thus it is apparent that there has been provided an adler lockout bar which fully meets the advantages and objectives described above. It is evident that the foregoing description will suggest minor modifications of the invention to those skilled in the art and accordingly, it is intended to embrace such modifications within the scope of the appended claims.

What is claimed is:

1. In a mule driven apparatus for an implement mounted on a garden tractor, said mule drive including a drive sheave on the tractor, a driven sheave on the implement, a frame means, first and second idler sheaves mounted through means to said frame means, an endless belt operatively disposed about said sheaves, said first idler sheave being movable between a position tensioning said belt and a position operatively disengaged from said belt, spring means biasing said first idler sheave to said tensioning position, and adjustable means connecting said second idler sheave to said frame means for regulating the tension on said belt, the improvement comprising an idler sheave lockout bar connected to said means mounting said first idler sheave and disposed to overcome said spring means to place said first idler sheave in said operatively disengaged position while maintaining the adjustment on said adjustable tension regulating means, said idler sheave lockout bar extending adjacent portion of said frame means, and shoulder means on said lockout bar disposed thereon to engage said portion of said frame means to maintain said idler sheave in said lockout position.

2. The invention in accordance with claim 1 said frame means having a slot, said lockout bar extending therethrough.

3. The invention in accordance with claim 2 and indicating means on said lockout bar to indicate the linear position thereof relative to said frame means.

4. The invention in accordance with claim 2 and said shoulder means comprising a notch in said bar adapted to engage said frame means.

5. The invention in accordance with claim 2 and disengageable stop means on the lower side of said lockout bar, said stop means being cooperative with said frame and disposed to prevent the undesired movement of said one idler sheave to the lockout position.

6. The invention in accordance with claim 1 wherein said adjustable means comprises a belt tensioning bolt interconnecting said means mounting said second idler sheave and said frame.

7. An idler sheave assembly for a garden tractor-implement mule drive comprising a frame, a transverse shaft mounted on said frame, first idler sheave means including a first idler sheave arm rotatably mounted on said shaft and a first idler sheave journaled near the distal end of said arm, a second idler sheave means laterally spaced from said first idler sheave means, belt tensioning means operatively associated with said first idler sheave means, idler lockout means operatively dissociated from said belt tension means in the normal operating position of said mule drive and disposed to move said first idler sheave means to a lockout position adapted to be operatively disengaged from said drive belt, and detent means on said idler lockout means operatively engageable with said frame to maintain said first idler sheave means in said lockout position.

8. The invention in accordance with claim 7 wherein said idler lockout means comprises an idler lockout bar connected with said first idler sheave arm and extending through a slot in said frame to a distal end and said detent means comprises a shoulder on said idler lockout bar near said distal end.

9. The invention in accordance with claim 8 and stop means disposed on said lockout bar to prevent the undesired travel of said idler sheave to said lockout position.

10. The invention in accordance with claim 8 an indicating means on said lockout bar for indicating its linear travel through said slot.

11. The invention in accordance with claim 7 and said belt tensioning means comprising spring means biasing said first idler sheave means against said drive belt and adjustable belt tightener means associated with said second idler sheave means for regulating the tension applied to said belt.

* * * * *